Aug. 28, 1956    R. M. BURNS    2,760,357
SALT WATER REEL
Filed May 27, 1952    2 Sheets-Sheet 1
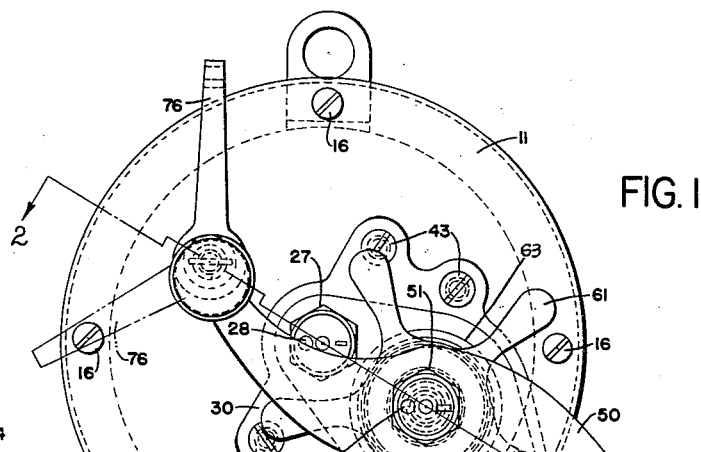
FIG. I
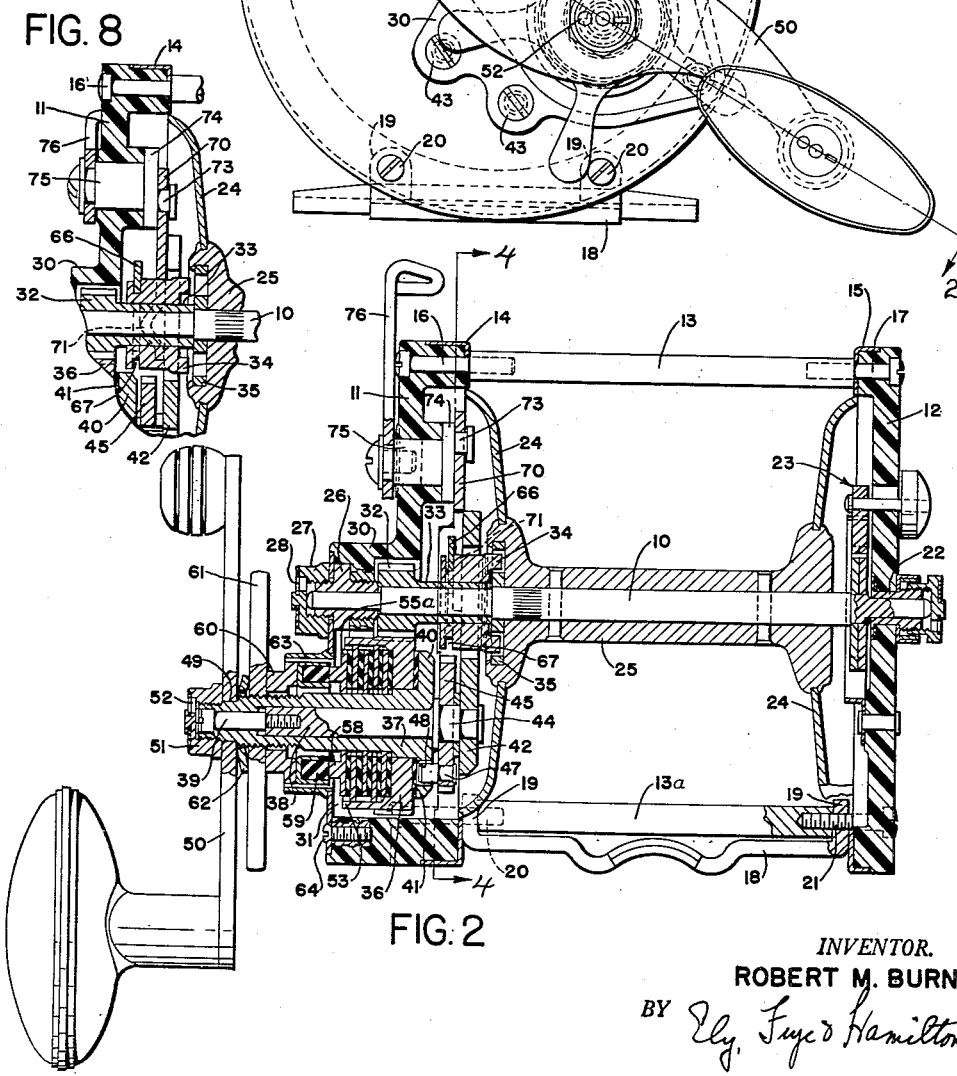
FIG. 8
FIG. 2
*INVENTOR.*
ROBERT M. BURNS
BY *Ely, Frye & Hamilton*
ATTORNEYS Aug. 28, 1956     R. M. BURNS     2,760,357
SALT WATER REEL
Filed May 27, 1952     2 Sheets-Sheet 2
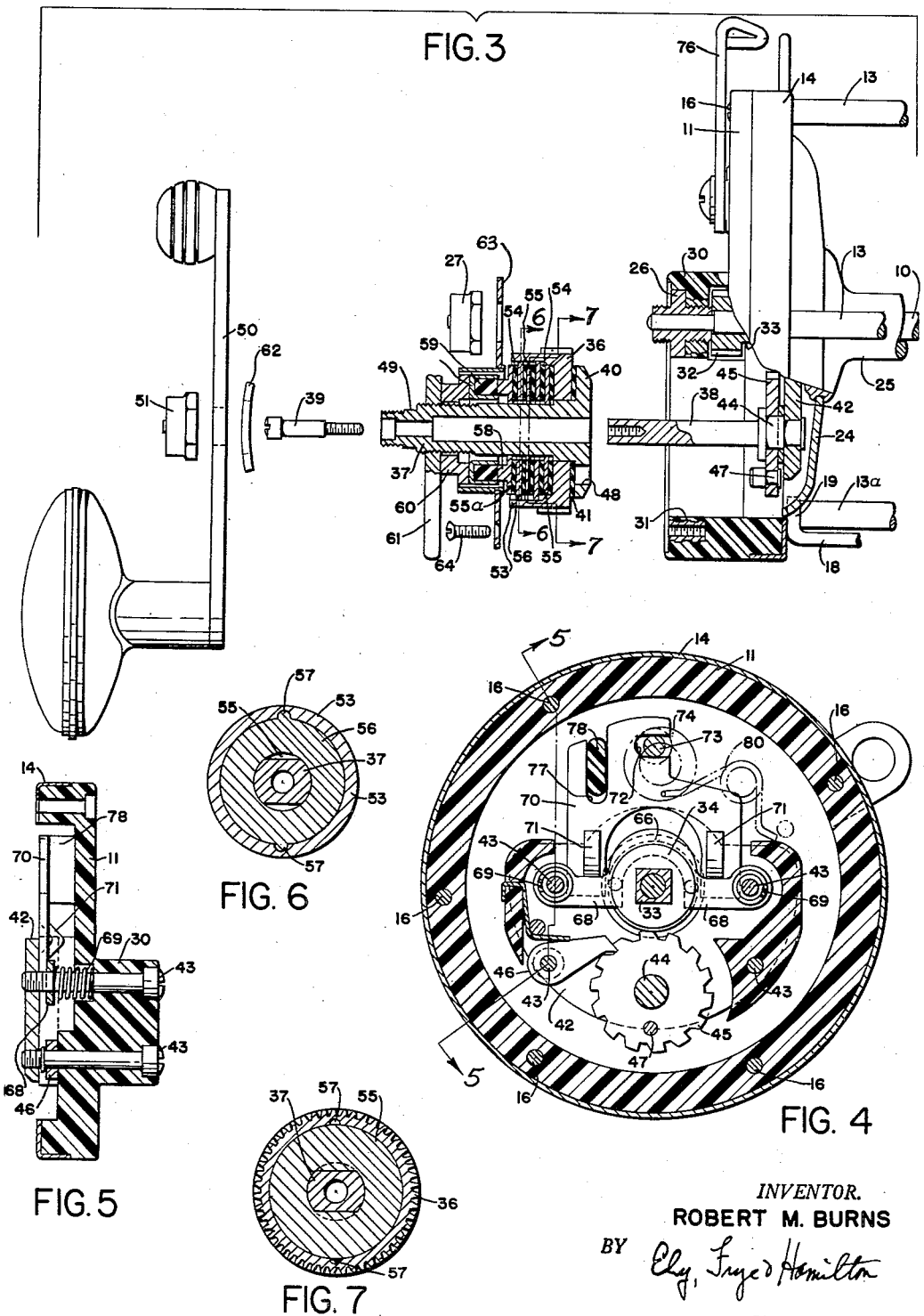
INVENTOR.
ROBERT M. BURNS
BY Ely, Frye & Hamilton
ATTORNEYS United States Patent Office 2,760,357
Patented Aug. 28, 1956

2,760,357

SALT WATER REEL

Robert M. Burns, Kent, Ohio, assignor to The Enterprise Manufacturing Company, Akron, Ohio, a corporation of Ohio Application May 27, 1952, Serial No. 290,303

4 Claims. (Cl. 64—1)

The invention relates generally to fishing reels, and more particularly to the larger types of reels used in salt water fishing. Such reels embody a drag mechanism providing an adjustable amount of friction between the crank handle and the spool driving gears so that free rotation of the spool in unwinding the line is retarded, and a ratchet mechanism is connected to the shaft which prevents the crank from turning in the direction to pay out the line.

The adjustable friction is provided by two or more abutting friction disks or washers located around the crank shaft, with means for pressing the disks together to adjust the amount of friction. These disks wear in use and require replacement, and the crank and gear mechanism also requires periodic cleaning and lubrication. Heretofore, it has been necessary to remove the whole end plate of the reel from the spool head or flange in order to gain access to the drag mechanism and gear drive, and this required removing or manipulating large numbers of screws. Moreover, it has been awkward and difficult to reassemble the mechanism because of the necessity of holding the parts of the drag and ratchet in proper relative position as they are assembled in the end plate.

In the present reel mechanism, a novel drag assembly is provided which can be easily and quickly removed as a unit merely by removing two nuts and two screws, making the friction elements easily accessible for removal separately. Removal of the drag assembly does not disturb the spool assembly and the ratchet mechanism is not removed so that the unit or assembly can be re-assembled in the end plate readily without any difficulty, and the ratchet mechanism is easily accessible in place for lubrication or repair when the drag unit is removed.

The novel drag assembly provides greatly increased friction brake area, thus giving longer life and greater heat dissipation.

Another object of the invention is to provide improved clutch means for releasing the driving gear from engagement with the spool shaft for allowing it to turn freely when desired, said clutch means normally producing a quiet and efficient driving connection between the driving gears and spool.

Other objects include the provision of an improved reel of extremely simple and economical construction which overcomes the disadvantages of prior reels, and is especially easy to disassemble and reassemble. It is to be understood that various changes and modifications may be made in that particular construction and arrangement without departing from the scope of the invention as defined in the claims forming part hereof.

Referring to the drawings in which a preferred embodiment of the invention is shown by way of example:

Fig. 1 is an elevation of the improved reel, looking toward the crank handle end;

Fig. 2 is a longitudinal section thereof, as on line 2—2 of Fig. 1;

Fig. 3 is an exploded view, partly in longitudinal section of the crank handle end of the reel, showing the manner of removing the novel drag assembly;

Fig. 4 is a cross sectional view, as on line 4—4, Fig. 2;

Fig. 5 is a sectional view as on line 5—5, Fig. 4;

Fig. 6 is a fragmentary cross sectional view, as on line 6—6, Fig. 3;

Fig. 7 is a fragmentary cross sectional view as on line 7—7, Fig. 3, and

Fig. 8 is a fragmentary sectional view similar to Fig. 2, showing the clutch disengaged from the spool shaft for allowing the spool to revolve freely without the drag.

Referring to Figs. 1 and 2, the reel includes a spindle or spool shaft 10 journaled in the front and back plates 11 and 12 which are connected in spaced relation by means of rods or pillars 13, the plates 11 and 12 and pillars 13 comprising the frame for the reel. The plates 11 and 12 are preferably made of hard rubber, Bakelite, or similar plastic material, and have flanged metal reinforcing and binding rings covering their inner edges, the ring on the front plate 11 being indicated at 14, and the ring on the back plate 12 at 15. The pillars 13 abut the inner surfaces of the rings 14 and 15 and are secured to the plates 11 and 12 by studs 16 and 17 respectively which extend through the plates and rings and are screwed into the ends of the pillars.

The plates 11 and 12 are also connected at one point by a one-piece cross plate 18 having the usual outer contour for attachment to a fishing rod. The cross plate is provided with angular flanges 19 at its ends for abutting the inner surfaces of the rings 14 and 15, and in order to provide a strong and solid mounting for the cross plate, two shortened pillars 13 are provided between said flanges 19. Screw studs 20 and 21 are entered from the outer faces of the plates 11 and 12 through the flanges 19 into threaded engagement with the ends of the pillars 13a. This provides a much longer engagement with the threads of the studs than if the studs were merely screwed in the relatively thin flanges 19 of the cross plate. On the back plate 12 is supported the bearing 22 for the spool shaft 10 and the usual click mechanism indicated generally at 23.

The end flanges 24 of the spool are secured in the ends of the hub 25 and the outer peripheries of the spool flanges lie within and are protected by the rings 14 and 15, the plates 11 and 12 being movable axially of the end flanges when the screw studs attaching the plates to the pillars are removed. The front plate 11 carries the bearing 26 for the front end of the spool shaft 10, the end of the shaft being covered by a cap 27 screwed on the bearing and having a small oil hole 28 therein. The bearing 26 is mounted in one end of a hollow boss 30 formed on and extending laterally of the spool shaft, a compartment or space 31 being provided within the boss 30 for the improved drag mechanism.

A driving pinion 32 is journaled on the front portion of spool shaft 10 and has an elongated square shank 33 extending into abutment with the front end of the hub 25. A two-dog clutch 34 is mounted on the shank 33 for axial sliding non-rotative movement and is normally in driving engagement with the socket in plate 35 of the hub 25, as shown in Fig. 2, so that rotation of the pinion 32 rotates the spool. The pinion 32 is in mesh with a driving gear 36 which is journaled on a hollow shaft 37 telescoped over the crank shaft post 38 and secured to the outer end of said post by a screw 39 countersunk in the outer end of the shaft. The inner end of the shaft 37 is provided with a flange 40 extending radially outward under the gear 36 with a friction washer 41 between the flange 40 and the gear 36.

The crank shaft post 38 is supported at its inner end on the bridge piece 42 which is mounted in the end plate 11 by screws 43 extending through the boss 30, and adjacent to the bridge piece the post has a shoulder 44 on which is journaled a ratchet wheel 45. The ratchet wheel 45 is held from rotation in one direction by a spring-pressed ratchet pawl 46, and the ratchet gear 45 has a pin 47 projecting from its outer periphery which is received in a hole 48 in the flange 40 of the shaft 37, making a detachable connection between the shaft and the ratchet gear. The outer end portion of the shaft 37 has a squared shoulder 49 and the crank handle 50 is keyed thereon. Preferably, the extreme outer end of shaft 37, in which the head of screw 39 is countersunk, projects beyond the handle 50, and has a cap 51 screwed thereon, the cap being provided with a small oil hole 52.

The drag mechanism for retarding movement of the spool in a direction to pay out the line wound thereon is mounted around the shaft 37 and between the shaft and the gear 36, so that when the handle is turned in a forward direction to wind the line the driving connection between the shaft 37 and gear 36 is a friction connection, and backward rotation of the shaft is prevented by engagement of the pawl 46 with ratchet wheel 45.

The gear 36 is provided at its outer periphery with an upwardly extending annular flange 53 forming an annular recess between the shaft 37 and the flange 53, and in this recess is a series or pile of fiber friction disks or washers 54 alternating with a series of metal disks or washers 55 and 56. As shown in Fig. 6, the disks 56 are keyed to the flange 53 at 57, and as shown at Fig. 7 the disks 55 are keyed to the shaft 37. The outermost metal disk 55a is preferably provided with an annular abutment rib 58 against which a floating resilient thrust washer or pad 59 of "neoprene" or the like bears, the casing of the washer 59 being abutted by a thrust washer 60 abutting a star wheel 61 which is screwed on the shaft 37 behind the shoulder 49. As shown in Fig. 2, a dished washer 62 may be provided between the star wheel 61 and the crank handle 50. A flanged metal cap or cover plate 63 fits around the washers 59 and 60 and is attached to the boss 30 by the cap 27 and a screw 64.

By turning the star wheel 61 the operator may easily adjust the amount of friction between the fiber disks 54 and the metal disks 55 and 56 to obtain the desired amount of drag retarding paying out of the line, because the disks 55 are keyed to the shaft 37 and the disks 56 are keyed to the gear 36. The thrust abutment between the floating neoprene pad 59 and rib 58 causes the thrust on the disks 54 to become equalized all around their annular friction surfaces so as to obtain maximum life before requiring replacement of the friction disks 54.

Referring to Fig. 3, it will be seen that by removing caps 27 and 51 and screws 39 and 64, the whole drag assembly can quickly and easily be removed as a unit from the recess 31 without affecting the spool assembly, the ratchet pawl 46 and ratchet gear remaining undisturbed because the hole 48 in the flange 40 slides off the pin 47 in the ratchet gear. After the drag assembly has been thus removed, the friction disks are easily accessible for examination or replacement merely by unscrewing the star wheel. The drag assembly is just as easily replaced by sliding the shaft 37 over the post 38 and turning the shaft until the hole 48 and pin 47 register. The whole operation of assembly and disassembly of the drag is made extremely simple and easy and is accomplished by manipulating only two caps and two screws instead of a relatively large number of screws as was heretofore necessary when the whole end plate had to be taken off. Moreover, because the drag assembly is handled as a unit, the disassembling and assembling operation is much handier and more convenient, and requires less skill, time and patience.

The novel drag construction has a large number of friction surfaces because of having a plurality of fiber friction disks, six such disks 41 and 54 being shown, with both surfaces of each disk offering frictional or braking resistance as the line is payed out against the drag. Thus the brake friction area is greatly multiplied, resulting in greater heat dissipation and longer life of the fiber disks.

The mechanism for shifting the clutch 34 to disengage it from driving engagement with the hub 25 of the spool preferably includes a yoke plate 66 engaging in a slot 67 in the clutch and having oppositely extending arms 68 which fit slidably over two of the screws 43 and are pressed by springs 69 to urge the clutch normally into engagement with the hub 25. In order to shift the clutch 34 axially of the shaft 38, a laterally shiftable plate 70 is provided having cam projections 71 which engage the arms 68 as the plate is shifted to move the yoke 66 axially against the pressure of springs 69 and disengage the clutch as shown in Fig. 8. The plate 70 has a slot 72 in one side engaged by a headed pin 73 eccentrically mounted on a disk 74 attached to the shaft 75 rotated by the clutch shifting lever 76, and the plate 70 also has a slot 77 slidably receiving a projection 78 on the end plate for guiding the plate along a substantially rectilinear path. A spring 80 is provided for maintaining the lever 76 in one or the other of the two positions shown in Fig. 1, one end of the spring being secured to the disk 74 and the other end abutting a shoulder in the end plate 11.

When the lever 76 is in the full line position, the clutch 34 is engaged with the spool hub 25, and when the lever is moved to the dot-dash position, the clutch is disengaged and the spool is free to rotate, and the improved shifting mechanism provides for disengaging the drive connection to the spool without disengaging the pinion 32 from the gear 36. This permits the use of high helical angle gears to provide greater tooth contact, better wearing qualities and quieter gear operation, than would be possible if the pinion were moved out of mesh with the gear to disengage the drive, as is necessary in certain prior reel constructions.

The improved reel of the present invention has a drag mechanism which provides greatly increased friction brake area, with equalized pressure on all of the friction surfaces, giving increased wear, has a drag assembly which is quickly and easily detachable giving access to the friction elements and to the gear mechanism, and has improved means for disengaging the spool from the driving mechanism when desired.

It will be understood that such modifications and variations of the invention as would be suggested to one skilled in the art and as fall within the scope of the invention as defined in the claims, are intended to be included herein.

What is claimed is:

1. In a reel structure having an end plate and a crank shaft post supported at one end in an eccentric position in the end plate, a drag compartment opening formed in the end plate around said post, and a drag assembly movable as a unit into and out of said compartment opening, said assembly including a hollow shaft telescopically slidable over said post, a gear journaled on said shaft, a pile of friction washers alternating with metal disks forming a frictional driving connection between the shaft and gear, certain of the disks being keyed to the gear and others being keyed to the shaft, and a cover plate for the compartment surrounding said drag assembly, said cover plate being mounted on the end plate by means of two screws.

2. In a reel structure having an end plate and a crank shaft post supported at one end in an eccentric position in the end plate, a drag compartment opening formed in the end plate around said post, and a drag assembly movable as a unit into and out of said compartment opening, said assembly including a hollow shaft telescopically slidable over said post, a gear journaled on said shaft, a pile of friction washers alternating with metal disks forming a frictional driving connection between the shaft and gear, certain of the disks being keyed to the gear and others being keyed to the shaft, means for compressing the washers and disks together, means for distributing said compressing force equally over the entire frictional area of the washers, and a cover plate for the compartment surrounding said pressure distributing means, said cover plate being mounted on the end plate by means of two screws.

3. In a reel structure having an end plate and crank shaft post supported at one end in an eccentric position in the end plate, a ratchet wheel journaled on the base of said post, a pawl on said plate preventing rotation of said ratchet wheel in one direction, a drag compartment opening formed in the end plate around said post, and a drag assembly movable as a unit into and out of said compartment opening, said assembly including a hollow shaft slidable over said post and detachably secured to said ratchet wheel, a gear journaled on said shaft, a pile of friction washers alternating with metal disks around said shaft and forming a frictional connection between the shaft and gear, certain of the disks being keyed to the gear and others to the shaft, and a cover plate for the compartment surrounding said drag assembly, said cover plate being mounted on the end plate by means of two screws.

4. In a reel structure having an end plate and crank shaft post supported at one end in an eccentric position in the end plate, a ratchet wheel journaled on the base of said post, a pawl on said plate preventing rotation of said ratchet wheel in one direction, a drag compartment opening formed in the end plate around said post, and a drag assembly movable as a unit into and out of said compartment opening, said assembly including a hollow shaft slidable over said post and detachably secured to said ratchet wheel, a gear journaled on said shaft, a pile of friction washers alternating with metal disks around said shaft and forming a frictional connection between the shaft and gear, certain of the disks being keyed to the gear and others to the shaft, means for compressing the washers and disks together, means for distributing said compressing force equally over the entire frictional areas of the washers, and a cover plate for the compartment surrounding said pressure distributing means, said cover plate being mounted on the end plate by means of two screws.

References Cited in the file of this patent

UNITED STATES PATENTS

| | | |
|---|---|---|
| 1,697,851 | Case | Jan. 8, 1929 |
| 1,765,903 | Case | June 24, 1930 |
| 1,836,755 | Hirsch | Dec. 15, 1931 |
| 2,162,774 | Coxe | June 20, 1939 |
| 2,224,080 | Hirsch et al. | Dec. 3, 1940 |
| 2,232,253 | Maynes | Feb. 18, 1941 |
| 2,263,836 | Balz et al. | Nov. 25, 1941 |
| 2,360,488 | Garman | Oct. 17, 1944 |
| 2,518,482 | Mandolf et al. | Aug. 15, 1950 |
| 2,553,200 | Mandolf et al. | May 15, 1951 |
| 2,646,939 | Hirsch | July 28, 1953 |